United States Patent [19]

Wentzler et al.

[11] Patent Number: 5,039,428

[45] Date of Patent: Aug. 13, 1991

[54] WASTE WATER TREATMENT PROCESS USING IMPROVED RECYCLE OF HIGH DENSITY SLUDGE

[75] Inventors: Thomas H. Wentzler; Surendra K. Mishra, both of The Woodlands; Roger N. Kust, Spring, all of Tex.; E. Stuart Savage, Wexford, Pa.

[73] Assignee: Tetra Technologies, Inc., Houston, Tex.

[21] Appl. No.: 488,643

[22] Filed: Mar. 5, 1990

[51] Int. Cl.$^5$ ............................................. C02F 1/52
[52] U.S. Cl. .................................... 210/711; 210/713; 210/714; 210/717; 210/724; 210/912
[58] Field of Search ................................ 210/710–713, 210/714, 715, 717, 724, 726, 912–914

[56] References Cited

U.S. PATENT DOCUMENTS

| | | |
|---|---|---|
| 3,575,853 | 4/1971 | Gaughan et al. ............... 210/713 |
| 3,617,559 | 11/1971 | Cywin ........................... 210/713 |
| 4,186,088 | 1/1980 | Fitch et al. ..................... 210/713 |
| 4,566,975 | 1/1986 | Allgulin .......................... 210/713 |
| 4,606,829 | 8/1986 | Rice et al. ...................... 210/721 |
| 4,728,438 | 3/1988 | Featherstone et al. ......... 210/714 |

FOREIGN PATENT DOCUMENTS 2216114 10/1989 United Kingdom ............... 210/713

Primary Examiner—Peter Hruskoci
Attorney, Agent, or Firm—Arnold, White & Durkee

[57] ABSTRACT

An improved process for removing dissolved metals from waste water using a recycle high density sludge is described. Specifically, the process comprises the steps of: (1) treating waste water containing dissolved metals with a recycle stream containing alkaline surface active recycle particles to precipitate the dissolved metals on the surface of the recycle particles; (2) treating a portion of the treated waste water containing metal precipitate solids with an alkaline reagent to form alkaline surface active recycle particles; (3) recycling the alkaline treated stream containing the alkaline surface active particles; and (4) separating the portion of the stream from step (1) not treated with alkaline reagent into a water component which is free of dissolved metals and solids and a sludge component which contains solids. The improved process is further enhanced by using a solids classification step to preferentially separate finer metal precipitate particles, which are treated with an alkaline reagent and recycled, from larger metal precipitate particles, which are discarded.

18 Claims, 4 Drawing Sheets

WASTE WATER TREATMENT PROCESS USING IMPROVED RECYCLE OF HIGH DENSITY SLUDGE

BACKGROUND OF THE INVENTION

The invention relates to an improved process for removing dissolved metals from waste water using a recycle high density sludge. More specifically, the process uses a recycle bypass stream prior to the sludge separation step to reduce the solids loading in the sludge separation step. The process may also include a solids classification step to preferentially recycle the smaller solids particles precipitated from the waste water and discard the larger particles precipitated from the waste water.

The removal of dissolved metals from waste water streams is desired in many industrial applications. The dissolved metals may include iron, aluminum, magnesium, zinc, and manganese. Typically, the dissolved metals are present in the waste water as chlorides and sulfates. For example, iron may be present as ferrous chloride ($FeCl_2$), ferric chloride ($FeCl_3$), ferrous sulfate ($FeSO_4$), and ferric sulfate [$Fe_2(SO_4)_3$]. The chloride and sulfate salts of the dissolved metals create an acidic environment in the waste water due to the dissolution of the salts into ionic forms. Ferric chloride ($FeCl_3$), for example, will dissolve in water to form trivalent iron ions ($Fe^{3+}$) and chloride ions ($Cl^-$).

Waste water containing dissolved metals occurs in numerous industrial processes. For example, acid mine drainage containing dissolved iron occurs as a result of mining operations. Known methods of treating waste water containing dissolved metals involve contacting the waste water with an alkaline material such as sodium hydroxide. The hydroxide compound causes the dissolved metals to precipitate as the corresponding metal hydroxide compounds. An example of this reaction is:

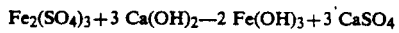

$$Fe_2(SO_4)_3 + 3\ Ca(OH)_2 \rightarrow 2\ Fe(OH)_3 + 3\ CaSO_4$$

As noted above, the ferric sulfate [$Fe_2(SO_4)_3$] forms trivalent iron ions ($Fe^{3+}$) and sulfate ions ($SO_4^{2-}$) in the waste water. The ferric hydroxide [$Fe(OH)_3$] is generally insoluble and forms a precipitate. The metal hydroxide precipitate is separated from the water by a settling device such as a thickener. The settling device produces a sludge containing the settled material and a water effluent that is relatively free of solids and dissolved metals.

Known methods using this process, particularly Kostenbader (U.S. Pat. No. 3,738,932), have attempted to improve the process by recycling some portion of the precipitated sludge material. Referring to FIG. 1, a process flow diagram of the Kostenbader process is shown. A waste water stream 1 containing dissolved metals is contacted with recycle particles which include hydroxyl ($OH^-$) groups in a precipitation reactor 2 to precipitate metal hydroxides on the surfaces of the recycle particles. The treated waste water stream 3 is fed to a separation device 4 which produces a water effluent stream 5 and a sludge stream 6. The water effluent stream 5 is relatively free of both dissolved metals and precipitated metal hydroxides.

A portion of the sludge stream 6 is discharged as waste sludge 8 and a portion is recycled as recycle sludge stream 7 to provide recycle particles for the precipitation reactor 2. The recycle sludge stream 7 is fed into adsorption reactor 9 along with alkaline reagent 10 where the alkaline reagent 10 forms hydroxyl ions ($OH^-$) which are adsorbed onto the surfaces of the recycle particles in the recycle sludge stream 7. The stream 11 from the adsorption reactor 9 containing the recycle particles with adsorbed hydroxyl groups ($OH^-$) is then fed to the precipitation reactor 2. It should be appreciated that any particular recycle particle starts out as a metal hydroxide precipitate particle which then continually grows due to layer upon layer of hydroxyl ($OH^-$) ions then metal hydroxide precipitates which are added to the particle surface as it is continually recycled.

Typically, the separation device 4 is a thickener. Essentially, the thickener provides a large volume where the metal hydroxide precipitates which are denser than water will settle towards the bottom of the thickener due to gravity and leave a zone of relatively clear, solids-free water at the top of the thickener. The rate of settling of the metal hydroxide precipitates is dependent on multiple factors such as the density of the precipitates relative to the density of the water, the size of the precipitate particles, and the surface area of the thickener. It should be appreciated that the surface area required of a thickener will vary with the type and amount of precipitate particles being separated. Thus, an increase in the amount of precipitate particles to be settled normally requires an increase in the surface area of the thickener.

The Kostenbader patent teaches that a sludge stream preferably containing 20 to 30 pounds of precipitates is recycled for every pound of dissolved metals in the waste water feed stream. (Col. 5, lines 49–52; col. 3, lines 37–40). The primary benefit of the method of the Kostenbader patent is that it produces a high density sludge containing 15 to 50 weight percent solids as contrasted to other, nonrecycle methods which produce sludges of only 1 or 2 weight percent solids. (Col. 1, lines 42–44).

Because the recycle method of the Kostenbader patent uses a large amount of recycle solids for each pound of dissolved solids to be precipitated, it requires a thickener—the most commonly used separation device for this application—with a large surface area. This results in the disadvantage that when waste water feed streams have high concentrations of dissolved metals the amount of recycle solids must increase, and therefore the surface area of the thickener must be increased. Thus, the Kostenbader process may require a large number of thickeners or thickeners of impractical size when waste water feed streams have high concentrations of dissolved metals. Therefore, the Kostenbader process is generally ineffective or impractical for removing dissolved metals from waste water streams with high concentrations of dissolved metals.

SUMMARY OF THE INVENTION

The present invention addresses the problems associated with separating dissolved metals from waste water by minimizing the solids loading in the separation step and by emphasizing the accumulation of the metal hydroxide precipitates on relatively small recycle particles of the precipitate. As described above, it is conventional in the art to treat waste water with an alkaline reagent such as calcium or sodium hydroxide to precipitate dissolved metals from waste water containing dissolved metals. The resulting mixture is then separated into a sludge and a water effluent, and a portion of the sludge may be treated with the alkaline reagent and then recycled to the precipitation stage.

In one embodiment of the invention, the waste water containing dissolved metals is treated with recycle particles to precipitate the dissolved metals on the surfaces of the recycle particles. A portion of the treated waste water stream which contains recycle particles with freshly precipitated metal hydroxides deposited on their surfaces is further treated with an alkaline reagent to activate the surface of the recycle particles with hydroxyl ions, and the recycle particles are again recycled to treat fresh waste water. The remaining portion of treated waste water which contains precipitated metal hydroxides deposited on the recycle particle surfaces is separated into a water component which is relatively free of recycle particles and dissolved metals and a sludge component which includes recycle particles and water. A portion of the sludge component may then be treated with an alkaline reagent to form further recycle particles which may also be used to treat fresh waste water. The remaining sludge component is then further treated or discarded.

Another embodiment of the invention comprises a process which involves preferentially treating relatively fine particles of metal hydroxide precipitates with the alkaline reagent before they are fed to the sludge separation stage. The treated fine particles are then recycled to the precipitation stage. In a preferred form, a hydrocyclone or other classification stage is interposed between the precipitation stage and the sludge separation stage; and the waste water containing metal hydroxide precipitates is passed through the hydrocyclone or other separator. In the classification stage, a relatively water-rich stream which preferentially contains relatively small precipitate particles is discharged as an overflow, and a sludge which preferentially contains relatively large precipitate particles is discharged as an underflow. When the fraction containing the smaller particles is treated and returned to the precipitation stage, the particles increase the efficiency of the overall processes as well as the density of the sludge.

Relatively small particles of precipitate are normally contained in both the overflow and underflow from the solids classification stage contemplated by the invention. Portions of both of these streams, accordingly, may be treated and recycled to the precipitation stage. Recycle of sludge from the sludge separation stage may also be performed. The general object is to increase the proportion of relatively fine particles of sludge and sludge components in the precipitation stage.

The mechanism by which the methods of the invention operate are not entirely clear or understood. It appears, however, that the mechanisms involve an interplay of particle size, surface effects, adsorptive forces and ionic reactions. Thus, by recycling particles of precipitate to the precipitation stage, a surface area is provided on which fresh precipitate may form. By recycling relatively small particles in preference to larger particles, the amount of surface area is maximized. Further, by mixing the recycle particles with an alkaline precipitant, the recycle particles appear to serve as nucleation sites for hydroxyl groups contained in the surrounding medium. These nucleation sites attract or adsorb other hydroxyl groups; and the hydroxyl groups, in turn, react with metal ions in the medium.

The overall effect then is to continuously generate and recycle small particles of precipitate and to accumulate additional precipitate on such particles. As the particles become large enough, they are removed from the recycle system to a separation stage where they are separated from their aqueous carrier. The efficiency of the separation stage is thereby enhanced since it is dealing selectively with relatively large particles. An effort to depict this mechanism is presented in FIG. 2.

Step 1 of FIG. 2 shows a wedge-shaped portion from the surface of a recycle particle which includes both iron (Fe) groups and hydroxyl ($OH^-$) ions in surface exposed positions. Free hydroxyl ions ($OH^-$) are adsorbed on the surface of the recycle particle in the adsorption reaction. Step 2 of FIG. 2 shows the recycle particle surface with adsorbed hydroxyl groups reacting with dissolved iron ions ($Fe^{3+}$) to precipitate iron hydroxide ($FeOH_2$) on the recycle particle surface.

This mechanism indicates that every time a recycle particle is recycled, the size of the particle grows because it adds more metal hydroxide precipitate on its surface. And, a larger particle will settle more efficiently and quickly in a thickener to form a denser sludge.

As noted above, the nature of this mechanism is not entirely understood. It appears that it is preferable to selectively recycle finer particles of precipitate while removing the larger particles. The smaller particles are believed to be more effective for precipitating the dissolved heavy metals, at least in part, because they provide a greater surface area with adsorbed hydroxyl groups to react with the dissolved metals than an equivalent weight of larger particles would provide. At the same time, the larger particles are easier to separate from the waste water effluent because by their nature they can be separated more efficiently and can be more easily dewatered than smaller particles.

DETAILED DESCRIPTION OF THE INVENTION

Figure 3:
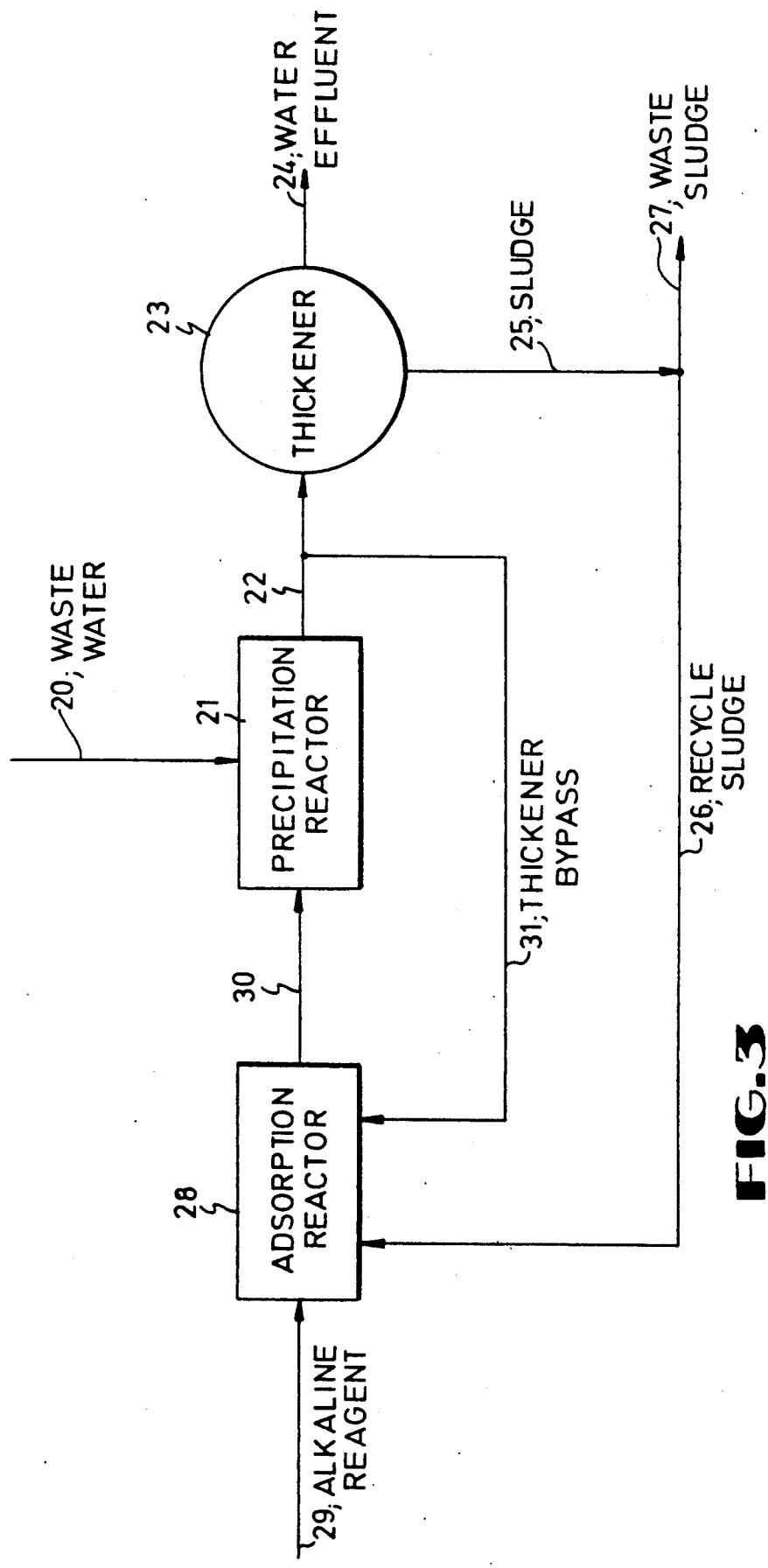
FIG. 3 is a flow diagram of one embodiment of the invention in which a recycle thickener bypass stream is included.

Referring to FIG. 3, a flow diagram is depicted of a process that includes a partial recycle of the precipitation reactor effluent directly to an adsorption reactor prior to a settling step. A primary benefit of this configuration is that a portion of the precipitate solids never go through the settling step. Consequently, the device used for the settling step, typically a thickener, need not be designed to accommodate these solids, and the same size settling device can be used for a waste water stream with a higher dissolved metals concentration while still maintaining an effective ratio of recycle solids to dissolved metals.

In FIG. 3, a waste water stream 20 containing dissolved metals is fed into a precipitation reactor 21, where the dissolved metals react with particles of recycle solids, and precipitate on the surfaces of the particles. Stream 22 from the precipitation reactor 21 is then fed to a thickener 23, but a portion of the stream 22 is recycled as a thickener bypass stream 31.

The thickener 23 produces a water effluent stream 24 and a sludge stream 25. The water effluent stream 24 is substantially free of dissolved metals and precipitates. The sludge stream 25 contains water and substantially all of the precipitates. A portion of the sludge stream 25 is recycled as recycle sludge stream 26 and the remainder of the sludge stream 25 is discharged as a waste sludge stream 27.

The recycle sludge stream 26 and thickener bypass stream 31 are mixed with alkaline reagent 29 in adsorption reactor 28. The alkaline reagent 29 contains a hydroxide compound such as calcium hydroxide [Ca(OH)$_2$] or sodium hydroxide (NaOH). The hydroxide compound dissolves in the water of the recycle sludge stream 26 and the thickener bypass stream to form hydroxyl ions (OH$^-$) which are adsorbed on the surface of the metal hydroxide precipitate particles to form recycle solids particles. Additional water may be added to the adsorption reaction 28 to help ensure that the hydroxide compound dissolves to form hydroxyl ions. The effluent stream 30 from the adsorption reactor 28 is fed to the precipitation reactor 21 to provide the recycle solids particles for precipitating the dissolved metals in waste water stream 20.

The amount of recycle solids fed to the precipitation reactor 21 may be adjusted by varying the amounts of the recycle sludge stream 26 and the thickener bypass stream 31. The rates of the recycle sludge stream 26 and thickener bypass stream 31 may be adjusted so that the combined amount of recycle solids for both streams can be varied from a ratio of about 10 pounds of recycle solids per pound of dissolved metals in the waste water feed to a ratio of 100 pounds of recycle solids per pound of dissolved metals in the waste water feed. Preferably, a ratio of about 20 to 30 pounds of recycle solids per pound of dissolved metals in the waste water feed is used.

The recycle ratio of recycle solids particles to dissolved metals in the waste water feed stream for any particular waste stream is dependent on the characteristics of that stream and can be determined by adjusting the recycle ratio in a particular application until the optimum thickener separation is achieved. Likewise, the amount of recycle solids from the thickener bypass stream 31 versus the amount from the recycle stream 26 may be varied to achieve optimum thickener separation. For example, all recycle solids can come from the thickener bypass stream 31, in which case the recycle sludge stream 26 is zero. Preferably, the amount of recycle solids from the thickener bypass stream 31 is maximized while the recycle solids from the recycle sludge stream 26 is minimized because this minimizes the solids loading in the thickener.

EXAMPLE 1

Figure 1:
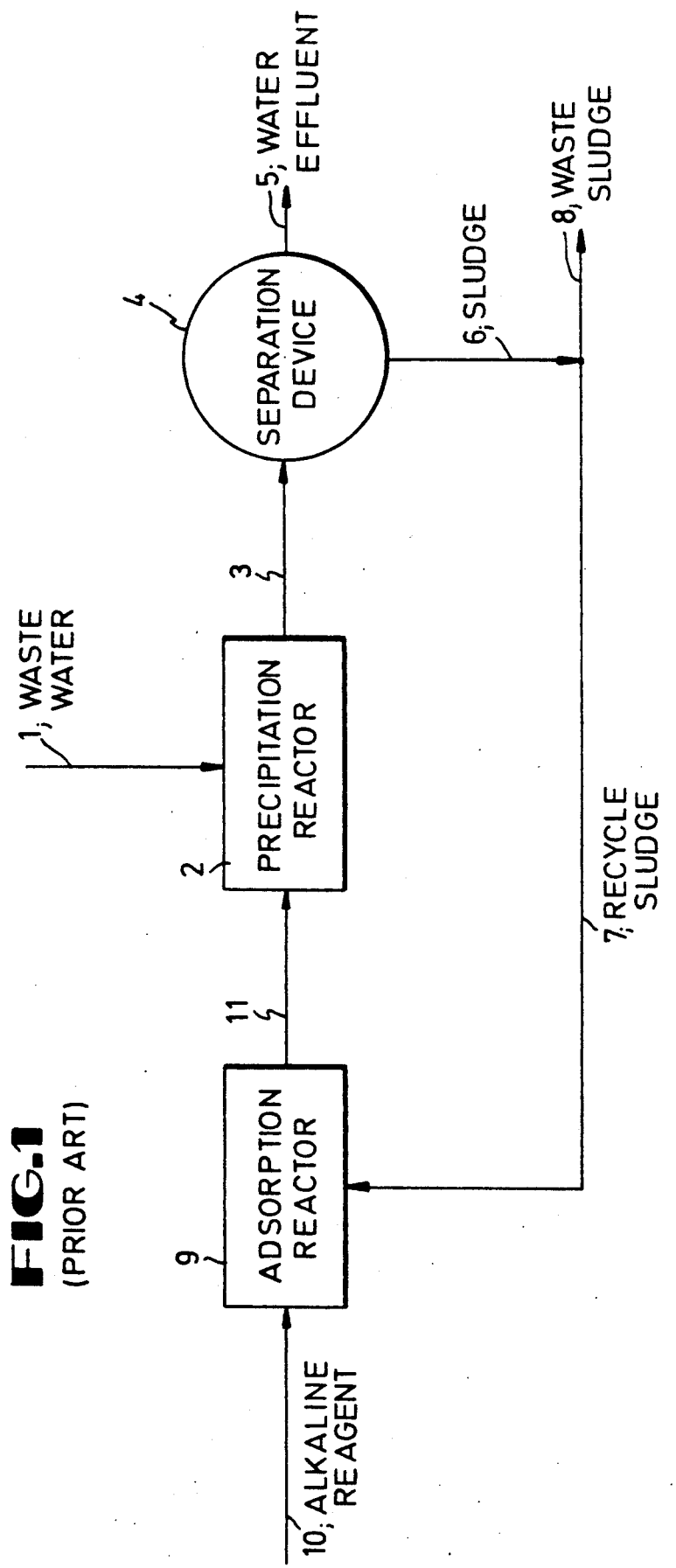
FIG. 1 is a flow diagram of a conventional waste water treating system.
Figure 2A:
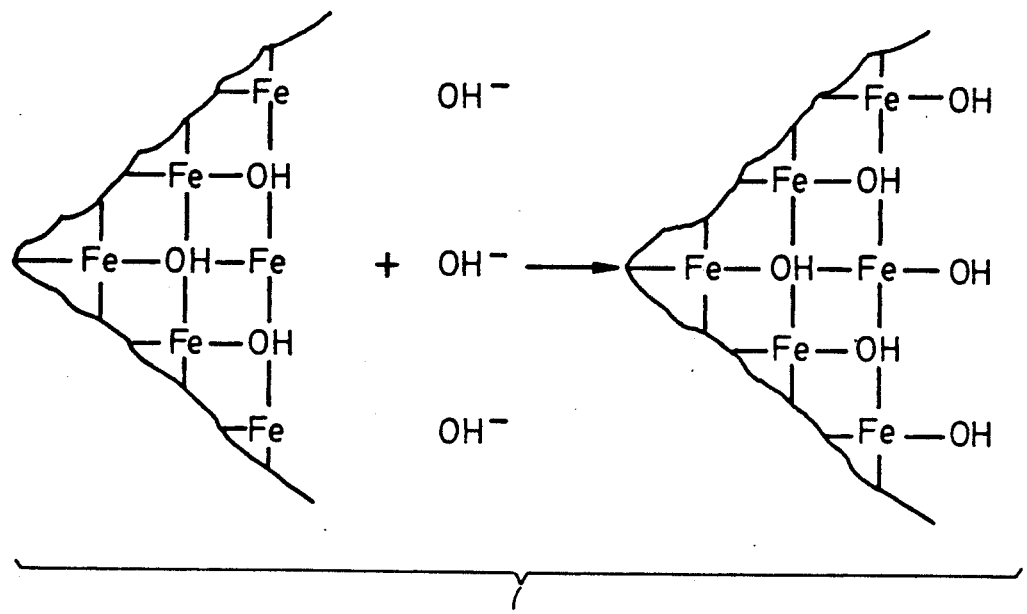
FIG. 2 is a diagram of the adsorption and precipitation reactions occurring on the recycle particle surface.
Figure 2B:
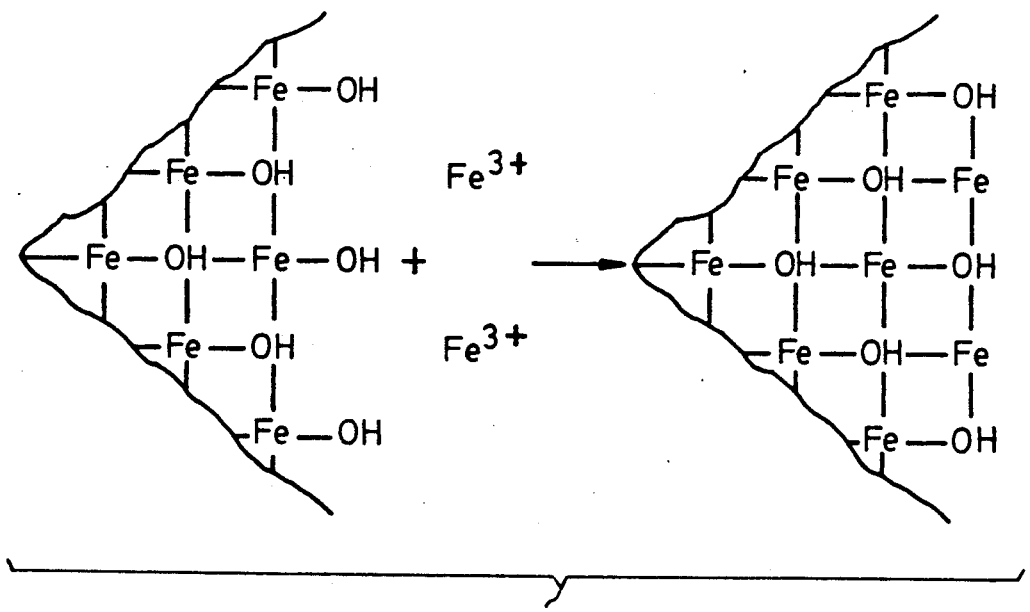

A waste pickle liquor obtained from a steel pipe cleaning operation and containing 42 grams/liter (0.35 lbs./gal.) of divalent (Fe$^{2+}$) iron and 3.5 wt. % free sulfuric acid was processed according to the teachings of the Kostenbader patent (see FIG. 1) using sodium hydroxide as a precipitating agent and recycling the sludge from the thickener underflow to the adsorption reactor. Air was injected into the precipitation reactor to oxidize the divalent iron ions (Fe$^{2+}$) to the trivalent (Fe$^{3+}$) form. The oxidation potential of the precipitation reactor was monitored with a platinum electrode and maintained at +200 mv to assure complete oxidation of the divalent iron ions. The ratio of precipitate solids recycled to dissolved metals in the waste water feed stream was 25/1. Initially, the process was started with a complete recycle of sludge until sufficient solids were developed for a 25/1 recycle ratio. Thereafter, the proper amount of sludge was recycled to achieve a 25/1 solids recycle ratio and the remaining sludge was discarded.

After forty hours of operation, the precipitates settled to form a sludge of 29.5 wt. % solids. When this sludge was filtered on a vacuum filter, the filter cake contained 48 wt. % solids. Because sodium hydroxide was used as the precipitating agent rather than a lime slurry (i.e., calcium hydroxide), the precipitates contained only iron oxides. If calcium hydroxide were used as the precipitating agent in this situation, then calcium sulfate would precipitate, and increase the solids that would have to be removed by the thickener.

A full scale plant designed on the basis of a feed stream flow rate of 200 gallons per minute with the composition specified above would generate 96.4 tons/day of precipitates. With a 25/1 recycle ratio for precipitate solids to dissolved solids in the waste water feed stream, this would correspond to a total of 2,506 tons/day of solids that must be separated in the thickener. Typically, the thickener size is calculated based on 30 square feet per ton of solids to be settled per day. Further, the area of the thickener is increased by 33% to compensate for contingencies. Consequently, a thickener with an area of approximately 100,000 square feet would be required to handle 2,506 tons/day of solids. This area corresponds to one thickener with a diameter of 356 feet, two thickeners with diameters of 252 feet each, or three thickeners with diameters of 206 feet each.

EXAMPLE 2

The same waste liquor treated in Example 1 was treated with the process of FIG. 3 where the thickener bypass stream 31 was taken directly from the precipitation reactor output stream 22 and fed to the adsorption reactor 28. Air was injected into the precipitation reactor 21 to oxidize the divalent iron (Fe$^{2+}$) to the trivalent (Fe$^{3+}$) form. The ratio of recycled solids to dissolved metals in the waste water feed stream 20 was 25 to 1. The sludge stream 25 was completely discarded as waste sludge stream 27, and there was no recycle sludge stream 26. Thus, all recycle solids came from the thickener bypass stream 31. After 56 hours of operation the precipitate had settled to form a sludge containing 28.9 wt. % solids. When this sludge was filtered on a vacuum filter, the cake that was formed contained 47 wt. % solids.

Using the same basis for calculating thickener size as was used in Example 1, the size of a thickener required for the process of FIG. 3 can be compared to the size of a thickener required by the Kostenbader process. This comparison is reported in Table 1.

TABLE 1

|  | Example 1 | Example 2 |
| --- | --- | --- |
| Dissolved metals in waste water (tons/day) | 96 | 96 |
| Recycle solids (tons/day) | 2,410 | 0 |
| Total solids fed to thickner (tons/day) | 2,506 | 96 |
| Area of thickner (ft.$^2$) | 99,989 | 3,846 |

TABLE 1-continued

|  | Example 1 | Example 2 |
|---|---|---|
| Diameter of thickener (ft.) | 356 | 70 |

From Table 1 we see that by reducing the solids loading on the thickener by using a recycle thickener bypass stream, the size of the thickener is significantly reduced and the cost and operating expenses of the thickener correspondingly decrease.

EXAMPLE 3

In another experiment a waste liquor containing 10 grams/liter (0.083 lbs/gal) of divalent ($Fe^{2+}$) iron and 8 grams/liter of free sulfuric acid was likewise processed using process of FIG. 3. The ratio of recycle solids to dissolved metals in the waste water feed stream was 30/1. As in Example 2, all recycle solids came from the thickener bypass stream, and the recycle sludge stream was zero. After 48 hours of operation, the precipitated solids settled to form a sludge containing 19.5 wt. % solids. When this sludge was filtered in a vacuum filter, the filter cake that was formed contained 35 wt. % solids.

Using the same basis as was used in Example 1, the size of a thickener for treating the waste stream of Example 3 may be compared to the thickener required for treating the same waste stream according to the Kostenbader process of Example 1. This comparison is reported in Table 2.

TABLE 2

|  | Example 1 | Example 2 |
|---|---|---|
| Dissolved metals in waste water (tons/day) | 12 | 12 |
| Recycle solids (tons/day) | 361 | 361 |
| Total solids fed to thickener (tons/day) | 373 | 12 |
| Area of thickener (ft.$^2$) | 14,883 | 479 |
| Diameter of thickener (ft.) | 69 | 12 |

The selective recycle of relatively fine solids particles provides the advantages of more surface area of active precipitating agent per pound of solids recycled. This further allows the use of a smaller thickener because relatively large particles are fed to the thickener, and large particles settle more efficiently than fine particles allowing a smaller thickener to be used. Because large particles settle more efficiently in a thickener, the water effluent stream from the thickener has less solids in it.

Figure 4:
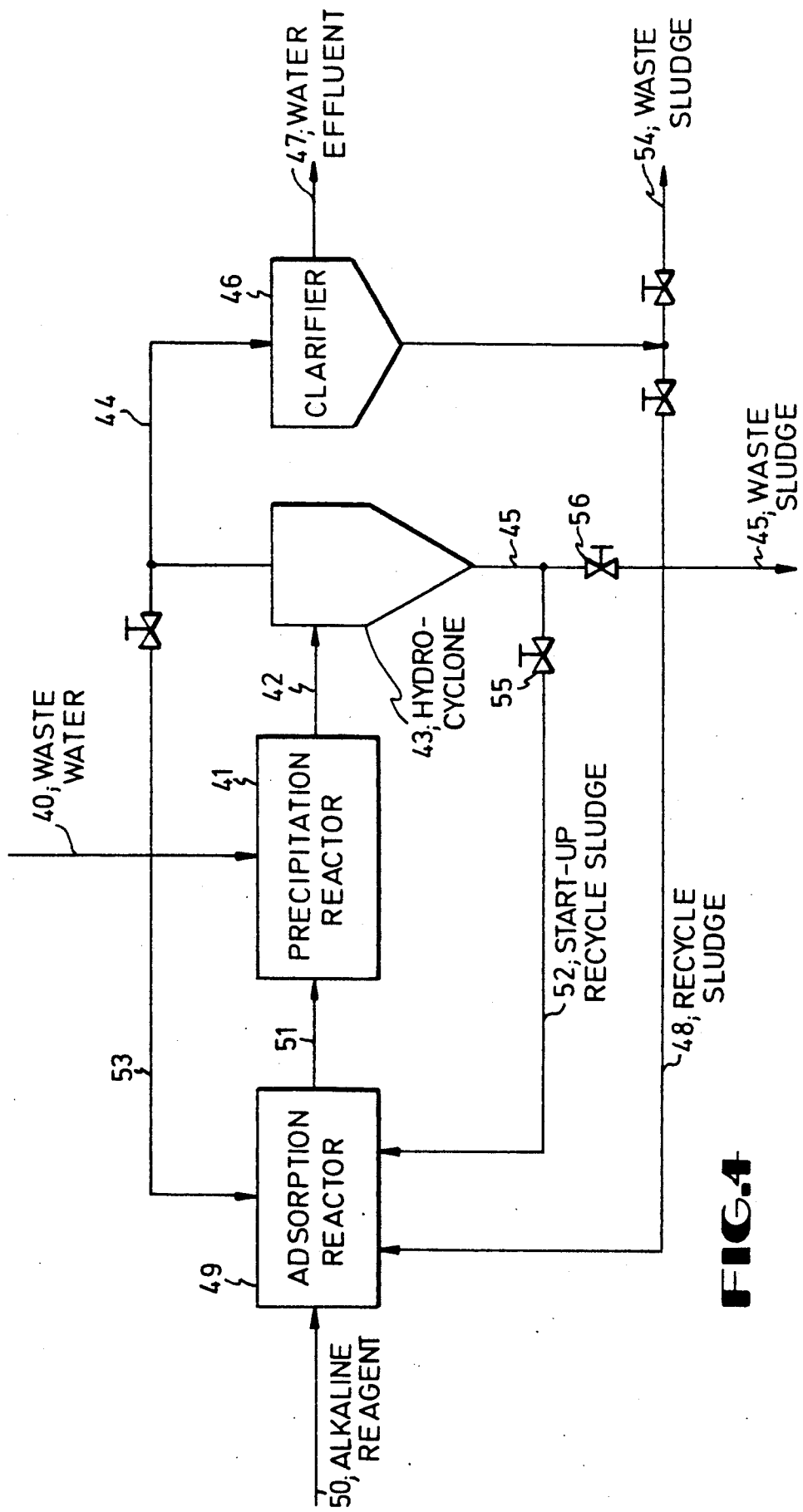
FIG. 4 is a flow diagram of another embodiment of the invention in which a hydrocyclone is included.

Referring to FIG. 4, a waste water stream 40 containing dissolved metals is fed into a precipitation reactor 41, where the dissolved metals react with particles of recycle solids, and precipitate on the surfaces of the particles. Effluent stream 42 from the precipitation reactor 41 is then fed to a hydrocyclone 43 or similar device. The hydrocyclone 43 separates the stream into a water-rich overflow stream 44 with a relatively low concentration of small particles and first a solids-rich waste sludge stream 45 with a relatively low concentration of water and a high concentration of large particles. It should be appreciated that the hydrocyclone classifies the solids based on particle size. The waste sludge stream 45 may be further dewatered by using conventional technology such as filters to produce a solid material to be discarded and a water stream that may be discharged or treated further. particles smaller than 5 microns, and an underflow stream 45 that includes predominantly particles larger than 5 microns.

Experiments conducted on a laboratory scale hydrocyclone revealed its effectiveness for separating the treated waste water stream. The laboratory hydrocyclone had the following characteristics:

| Size | 0.5 in |
|---|---|
| Inlet Pressure | 54 psi |
| Slurry Throughput | 1.4 gpm |
| Apex Diameter | 0.125 in |
| Vortex Finder | 0.125 in |
| Feed Inlet Area | 0.012 in$^2$ |

The results of three experiments conducted on the laboratory hydrocyclone are repeated in Table 3.

TABLE 3

|  | Feed | Overflow | Underflow |
|---|---|---|---|
| Experiment No. 1 |  |  |  |
| lb./hr. solid | 11.0 | 2.0 | 9.0 |
| lb./hr. liquid | 687.0 | 369.0 | 318.0 |
| total | 698.0 | 372.0 | 326.0 |
| gpm | 1.4 | 0.7 | 0.6 |
| wt. % solids | 1.5 | 0.6 | 2.6 |
| solid recovery in underflow 81.8 wt. % |  |  |  |
| Experiment No. 2 |  |  |  |
| lb./hr. solid | 27.0 | 6.0 | 21.0 |
| lb./hr. liquid | 667.0 | 363.0 | 304.0 |
| total | 694.0 | 369.0 | 325.0 |
| gpm | 1.4 | 0.7 | 0.6 |
| wt. % solids | 3.9 | 1.6 | 6.5 |
| Solid recovery in underflow 77.8 wt. % |  |  |  |
| Experiment No. 3 |  |  |  |
| lb./hr. solid | 56.0 | 12.0 | 44.0 |
| lb./hr. liquid | 667.0 | 352.0 | 317.0 |
| total | 694.0 | 364.0 | 362.0 |
| gpm | 1.4 | 0.7 | 0.7 |
| wt. % solids | 7.8 | 3.3 | 12.3 |
| Solid recovery in underflow 78.6 wt. % |  |  |  |

The following results were obtained from a particle size analysis of the solids in the overflow and underflow of Experiment No. 3:

| Particle Size | % Volume |  |
|---|---|---|
| (microns) | Overflow | Underflow |
| +17 | 1.8 | 4.3 |
| +12-17 | 0 | 4.8 |
| +8-12 | 2.1 | 8.2 |
| +5-8 | 6.2 | 19.4 |
| +3-5 | 45.7 | 37.5 |
| +1-3 | 44.0 | 25.8 |

These results indicate that the relatively fine particles were concentrated into the overflow, while the relatively large particles were concentrated into the underflow. For example, 89.7% by volume of the overflow particles were smaller than 5 microns, while only 63.3% by volume of the underflow particles were smaller than 5 microns. Likewise, only 3.9% by volume of the overflow particles were greater than 8 microns, while 17.3% by volume of the underflow particles were greater than 8 microns.

The clarifier 46 may be replaced with other conventional technology for separation of the recycle solids particles from the water. For example, a hydrocyclone may be used in place of the clarifier to produce an overflow water effluent stream that is substantially free of solids particles and an underflow recycle sludge stream comprising water and recycle solids particles.

When the process as shown in FIG. 4 is first started, no large particles will normally have developed. Consequently, all particles are recycled until large particles are developed to form a waste sludge. This may be accomplished by recycling all of waste sludge stream 45 as a start-up recycle sludge stream 52 by closing valve 56 and opening valve 55. Once the particles in the start-up recycle sludge stream 52 have reached an effective size, this recycle is stopped by closing valve 55 and opening valve 56, and the stream is discharged as waste sludge. For example, once the recycle solids particles have reached about 5 microns in size the recycle may be discontinued.

The methods and apparatus described above illustrate the invention, and other variations and modifications may be made without departing from the scope of the invention. It is understood that the details and examples described above are to be interpreted as explanatory and not in a limiting sense.

What is claimed is:

1. A process for removing dissolved metals from waste water, comprising the steps of:
    (a) treating the waste water with an effective amount of alkaline surface activity particles, which have an alkaline surface activity, to precipitate the dissolved metals on the surfaces of the particles;
    (b) treating a first portion of the waste water that has been treated in accordance with step (a) with an effective amount of an alkaline reagent to provide alkaline surface activity to the particles in the first portion of the treated waste water;
    (c) recycling the first portion of alkaline treated waste water from step (b), which comprises an effective amount of alkaline surface activity particles, directly to step (a) without separating said particles from said waste water for precipitation of the dissolved metals on the surfaces of the particles; and
    (d) separating a second portion of the waste water that has been treated in accordance with step (a) into a water component which is substantially free of particles and a sludge component which comprises particles and water.

2. The process of claim 1 wherein the particles of step (a) comprise hydroxyl groups and precipitated hydroxide compounds of the dissolved metals.

3. The process of claim 1 wherein the separation of step (d) comprises a thickening step.

4. A process for removing dissolved metals from waste water, comprising the steps of:
    (a) treating the waste water with an effective amount of alkaline surface activity particles, which have an alkaline surface activity, to precipitate the dissolved metals on the surfaces of the particles;
    (b) removing a first portion of the waste water that has been treated in accordance with step (a) and subsequently treating said first portion with an effective amount of an alkaline reagent to provide alkaline surface activity to the particles in the portion of treated waste water from step (a);
    (c) recycling the portion of alkaline treated waste water from step (b), which comprises an effective amount of alkaline surface activity particles, to step (a);
    (d) separating a second portion of the waste water that has been treated in accordance with step (a) into a water component which is substantially free of particles and a sludge component which comprises particles and water;
    (e) treating a portion of the sludge component from step (d) with an effective amount of alkaline reagent to provide alkaline surface activity to the particles; and
    (f) recycling the treated sludge component portion from step (e) which comprises alkaline surface activity particles to step (a).

5. The process of claim 4 wherein the alkaline reagent of steps (b) and (e) comprise a hydroxide compound which dissolves in water to form hydroxyl ions.

6. The process of claim 4 wherein the ratio by weight of particles formed in both steps (b) and (e) to dissolved metals in the waste water ranges from about 5:1 to 100:1.

7. A process for removing dissolved metals from waste water, comprising the steps of:
    (a) treating the waste water with an effective amount of particles which have an alkaline surface activity to precipitate the dissolved metals on the surfaces of the particles;
    (b) separating the treated waste water stream into a water-rich component and a solids-rich component, in which the water-rich component has recycle particles of a smaller mean particle size than the mean particle size of particles of the solids-rich component;
    (c) separating the water-rich component of step (b) into a sludge component and a water component which is substantially free of solids;
    (d) treating the sludge component with an effective amount of alkaline reagent to form particles with an alkaline surface activity for use in step (a); and
    (e) recycling the alkaline treated sludge component of step (d) to step (a).

8. The process of claim 7 wherein the particles of step (a) comprise hydroxyl ions and precipitate hydroxide compounds of the dissolved metals.

9. The process of claim 7 wherein the alkaline reagent of step (d) comprises a hydroxide compound which dissolves in water to form hydroxyl ions.

10. The process of claim 7, further comprising the step of treating a portion of the water-rich component of step (b) with an effective amount of alkaline reagent to form the particles with an alkaline surface activity for use in step (a).

11. The process of claim 7 wherein the separation of step (b) is accomplished by a hydrocyclone.

12. The process of claim 7, further comprising the step of substantially dewatering the solids-rich component of step (b).

13. A process for removing dissolved metals from waste water comprising:
    (a) treating the waste water, which comprises dissolved metals, with an effective amount of recycle particles which have an alkaline surface activity to precipitate the dissolved metals on the surfaces of the recycle particles;
    (b) separating the treated waste water stream into a water-rich component and a solids-rich component, such that the water-rich component has recycle particles of a smaller mean particle size than the recycle particles of the solids-rich component;
    (c) separating the water-rich component of step (b) into a recycle sludge component and a water component which is substantially free of solids and;

(d) treating a portion of the recycle sludge component of step (c) with an effective amount of alkaline reagent to form the recycle particles for use on step (a), and discharging a portion of the recycle sludge component of step (c).

14. The method of claim 13 which further comprises recycling at least a portion of the sludge component to step (a).

15. A method of removing dissolved metals which form insoluble hydroxides from waste water containing such dissolved metals, which comprises the steps of:
(a) treating a stream of the waste water with alkaline water in sufficient quantity and alkalinity to precipitate the dissolved metals as insoluble metal hydroxide particles;
(b) recycling a first portion of the treated stream comprising an effective amount of said metal hydroxide particles to the treating step for precipitation of the dissolved metals on the surfaces of the metal hydroxide particles without separating said metal hydroxide particles from the treated stream; and
(c) separating a second portion of the treated stream into a first fraction comprising insoluble metal hydroxides and a second fraction comprising clarified waste water.

16. The method of claim 15 further comprising the step of recycling a portion of the second fraction to the treating step.

17. The method of claim 16 further comprising the step of preferentially concentrating metal hydroxide particles of relatively small particle size into said first portion and particles of relatively large particle size into said second portion.

18. The method of claim 17 wherein the step of preferential concentration comprises hydrocycloning the treated stream of waste water.

* * * * *

UNITED STATES PATENT AND TRADEMARK OFFICE
CERTIFICATE OF CORRECTION

PATENT NO. : 5,039,428

DATED : August 13, 1991

INVENTOR(S) : Wentzler et al.

It is certified that error appears in the above-identified patent and that said Letters Patent is hereby corrected as shown below:

1. Col. 7, line 68, please insert application page 18 after "further" and before ". particles". Page 18 of the application reads as follows:

--The overflow stream 44 feeds a clarifier 46. The clarifier 46 allows the particles in the overflow stream 44 to settle by gravity and produces a water effluent stream 47 which is discharged and a recycle sludge stream 48 which is recycled.

The recycle sludge stream 48 is fed into the adsorption reactor 49 along with alkaline reagent 50 to form a slurry stream 51 of water and recycle solids particles which contain adsorbed hydroxyl groups. The slurry stream 51 is fed to the precipitation reactor 40.

Some portion of the hydrocyclone overflow stream 44 may also be recycled as recycle stream 53 to the adsorption reactor 44. This reduces the size of clarifier 46 or other separation device necessary for removing the solids particles from the water effluent stream 47 that is ultimately discharged. The sludge produced by the clarifier 46 in this configuration may be recycled as recycle sludge stream 48, or may be discharged as waste sludge 54, or may be partially recycled and partially discharged.

The hydrocyclone may be any commercially available type which is designed and operated to separate solid particles at a predetermined effective size. For example, assuming 5 microns to be the most effective size to separate the particles, this would result in an overflow stream 44 that includes predominantly--

UNITED STATES PATENT AND TRADEMARK OFFICE
CERTIFICATE OF CORRECTION

PATENT NO. : 5,039,428
DATED : August 13, 1991
INVENTOR(S) : Wentzler et al.

It is certified that error appears in the above-identified patent and that said Letters Patent is hereby corrected as shown below:

2. Col. 11, line 16, insert --directly-- between "(b)" and "recycling".

3. Col. 12, line 11, replace "claim 16" with --claim 15--.

Signed and Sealed this

Twenty-eighth Day of June, 1994

Attest:

BRUCE LEHMAN

Attesting Officer    Commissioner of Patents and Trademarks

REEXAMINATION CERTIFICATE (2270th)
United States Patent [19]
Wentzler et al.

[11] B1 5,039,428
[45] Certificate Issued Apr. 12, 1994

[54] WASTE WATER TREATMENT PROCESS USING IMPROVED RECYCLE OF HIGH DENSITY SLUDGE

[75] Inventors: Thomas H. Wentzler; Surendra K. Mishra, both of The Woodlands; Roger N. Kust, Spring, all of Tex.; E. Stuart Savage, Wexford, Pa.

[73] Assignee: Tetra Technologies, Inc., The Woodland, Tex.

Reexamination Request:
No. 90/002,964, Feb. 19, 1993

Reexamination Certificate for:
Patent No.: 5,039,428
Issued: Aug. 13, 1991
Appl. No.: 488,643
Filed: Mar. 5, 1990

[51] Int. Cl.$^5$ .................................................. C02F 1/52
[52] U.S. Cl. .................................. 210/711; 210/713; 210/714; 210/717; 210/724; 210/912

[56] References Cited
U.S. PATENT DOCUMENTS

| | | | |
|---|---|---|---|
| 2,668,667 | 2/1954 | Fern et al. | 241/24 |
| 2,996,187 | 8/1961 | Payne | 209/211 |
| 3,323,900 | 6/1967 | Takahashi et al. | 75/2 |
| 3,407,934 | 10/1968 | Ejefors | 210/73 |
| 3,485,356 | 12/1969 | Burr | 209/3 |
| 3,575,853 | 4/1971 | Gaughan et al. | 210/713 |
| 3,594,315 | 7/1971 | Buban | 210/73 |
| 3,617,559 | 11/1971 | Cywin | 210/713 |
| 3,738,932 | 6/1973 | Kostenbader | 210/721 |
| 3,890,229 | 6/1975 | Eder | 210/128 |
| 4,017,390 | 4/1977 | Vicard | 210/304 |
| 4,145,278 | 3/1979 | Davy | 210/711 |
| 4,186,088 | 1/1980 | Fitch et al. | 210/713 |
| 4,250,027 | 2/1981 | Cases et al. | 209/233 |
| 4,313,822 | 2/1982 | Cases et al. | 209/233 |
| 4,425,228 | 1/1984 | Lynn et al. | 209/17 |
| 4,465,597 | 8/1984 | Herman et al. | 210/713 |
| 4,492,627 | 1/1985 | Crea | 209/3 |
| 4,500,324 | 2/1985 | Vuong | 48/197 R |
| 4,566,975 | 1/1986 | Allgulin | 210/713 |
| 4,595,492 | 6/1986 | Crea et al. | 209/2 |
| 4,606,829 | 8/1986 | Rice et al. | 210/713 |
| 4,728,438 | 3/1988 | Featherstone et al. | 210/714 |
| 4,737,271 | 4/1988 | Childs | 209/144 |

FOREIGN PATENT DOCUMENTS

| | | | |
|---|---|---|---|
| 48-98651 | 12/1976 | Japan . | |
| 2216114 | 10/1989 | United Kingdom | 210/713 |

*Primary Examiner*—Peter A. Hruskoci

[57] ABSTRACT

An improved process for removing dissolved metals from waste water using a recycle high density sludge is described. Specifically, the process comprises the steps of: (1) treating waste water containing dissolved metals with a recycle stream containing alkaline surface active recycle particles to precipitate the dissolved metals on the surface of the recycle particles; (2) treating a portion of the treated waste water containing metal precipitate solids with an alkaline reagent to form alkaline surface active recycle particles; (3) recycling the alkaline treated steam containing the alkaline surface active particles; and (4) separating the portion of the stream from step (1) not treated with alkaline reagent into a water component which is free of dissolved metals and solids and a sludge component which contains solids. The improved process is further enhanced by using a solids classification step to preferentially separate finer metal precipitate particles, which are treated with an alkaline reagent and recycled, from larger metal precipitate particles, which are discarded.

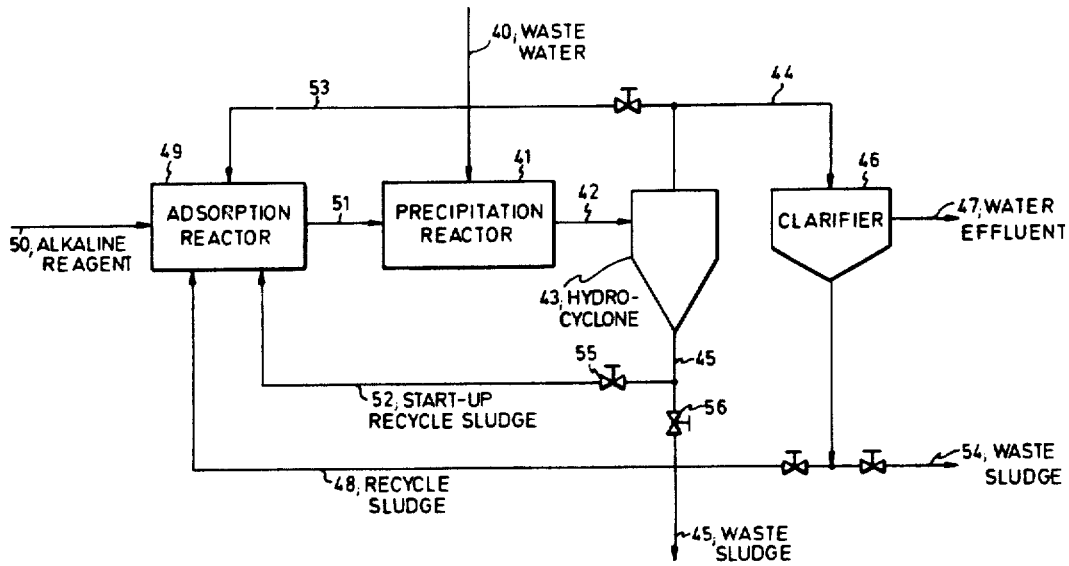

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 4–18 is confirmed.

Claims 1-3 are cancelled.

* * * * *